UNITED STATES PATENT OFFICE.

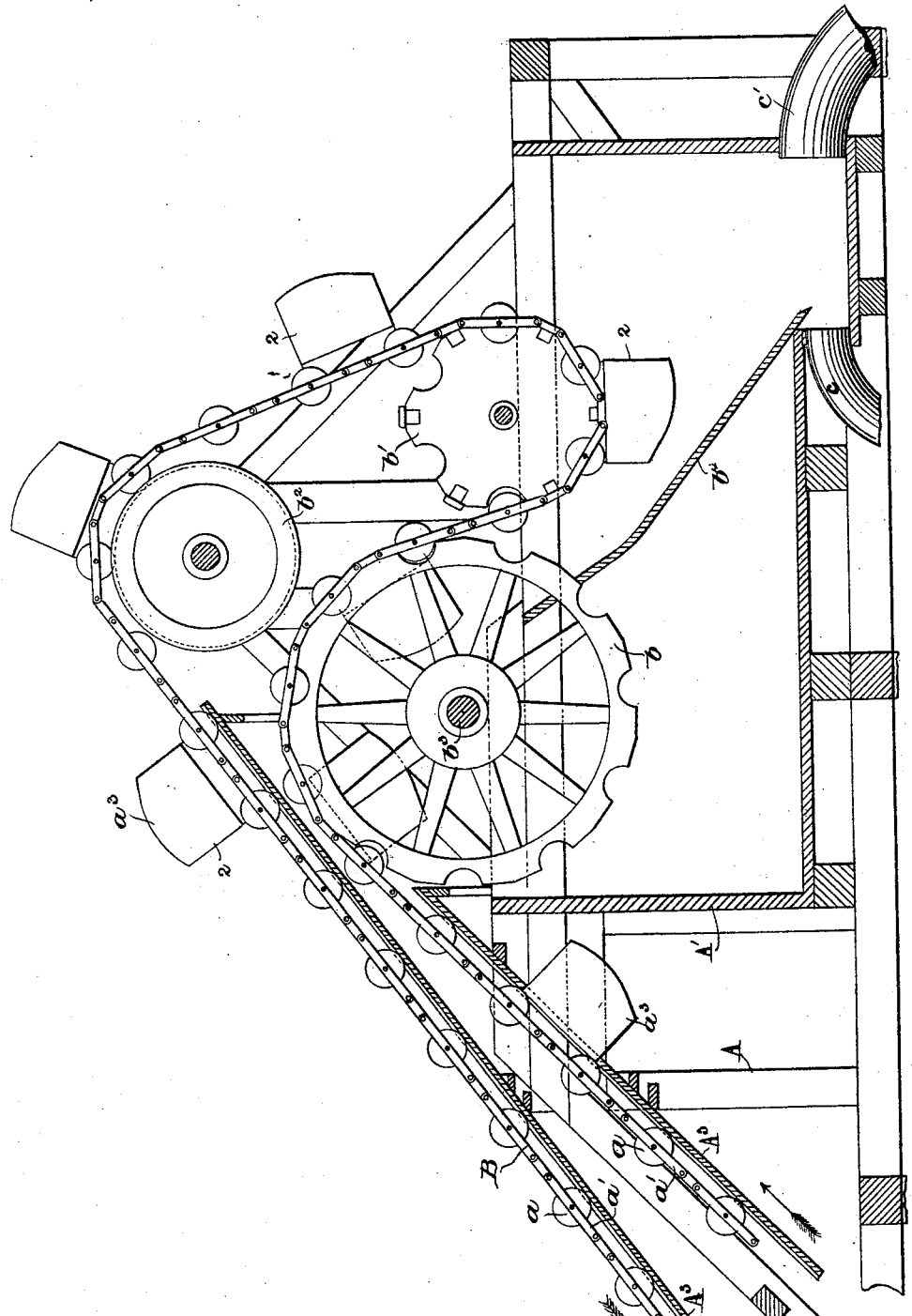

ROBERT H. FRASER, OF BOURNE, ASSIGNOR TO FREDERIC A. LOCKWOOD, OF BOSTON, MASSACHUSETTS.

DREDGING APPARATUS.

SPECIFICATION forming part of Letters Patent No. 457,314, dated August 4, 1891.

Application filed May 29, 1890. Serial No. 353,531. (No model.)

*To all whom it may concern:*

Be it known that I, ROBERT H. FRASER, of Bourne, county of Barnstable, State of Massachusetts, have invented an Improvement in Dredging Apparatus, of which the following description, in connection with the accompanying drawing, is a specification, like letters on the drawing representing like parts.

This invention relates to dredging apparatus of that class in which the dredged material is carried up a track or run by means of an endless chain of buckets and discharged into a hopper, from which the said material is carried away by a stream of water, substantially as shown and described in United States Patent No. 285,340, dated September 18, 1883.

With the class of apparatus referred to the dredged material is discharged directly from the buckets into the hopper and falls in masses upon the stream of water that is intended to carry away the said material, often completely blocking said stream of water and rendering the entire apparatus inoperative for the time, causing not only great annoyance, but serious loss, on account of the frequent delays. My invention has for its object to prevent these delays and consequent loss caused by blocking the stream of water. Accordingly, I provide at one side or at one end of the hopper an inclined distributing or feed plate, upon which the dredged material is discharged from the buckets, and from this distributing or feed plate the dredged material gradually falls or slides into the hopper, and as it slides in it is acted upon by the stream of water without blocking it, and as a further result the dredged material is more thoroughly disintegrated, and consequently more readily carried away from the hopper by the stream of water.

My invention therefore consists in the combination, in a dredge, scow, or other mechanism adapted to carry away dredged material, of an inclined distributing or feed plate upon which the dredged material is discharged from dredge-buckets or is otherwise thrown, with a hopper into which the said material falls or slides from the said feed-plate, a pipe to supply a stream of water to said hopper, and a discharge-pipe from said hopper, substantially as will be described.

The drawing shows in section and elevation a sufficient portion of a dredging apparatus to embody my invention.

The frame-work A of the apparatus may be of any suitable shape to sustain the hopper A' and distributing or feed plate $b^4$ and the pipes $c$ and $c'$. The material discharged from the buckets falls upon an inclined distributing or feed plate $b^4$, secured to the hopper A', and gradually slides off from the lower edge of the said plate into said hopper and is carried away through the discharge-pipe $c'$ in and by a stream of water admitted into the hopper through the pipe $c$. As the material falls off from the lower edge of the distributing-plate only a substantially small quantity of the said material is presented to the action of the stream of water at once, and as a result the material is more thoroughly broken up, and therefore more easily and readily carried away by the stream of water, and the latter is not liable to become checked or rendered inefficient in operation.

Material may be discharged or thrown upon the distributing or feed plate connected with a suitable hopper from the buckets of any dredging apparatus or by laborers or other means.

I claim—

The combination, in a dredge, scow, or other mechanism adapted to carry away dredged material, of an inclined distributing or feed plate $b^4$, upon which the dredged material is discharged, with a hopper A', into which the said material falls or slides from the said feed-plate, a pipe $c$ to supply a stream of water to said hopper, and a discharge-pipe $c'$ from said hopper, substantially as described.

In testimony whereof I have signed my name to this specification in the presence of two subscribing witnesses.

ROBERT H. FRASER.

Witnesses:
 JAS. H. CHURCHILL,
 EMMA J. BENNETT.